United States Patent
Williams et al.

(10) Patent No.: US 7,093,618 B2
(45) Date of Patent: Aug. 22, 2006

(54) LOUNGE VALVE MOUNTING HOUSING AND ASSEMBLY

(75) Inventors: Mark W. Williams, Phoenix, AZ (US); Robert D. Sleeper, Laveen, AZ (US); Stuart K. Denike, Phoenix, AZ (US); Don J. Atkins, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 162 days.

(21) Appl. No.: 10/836,985

(22) Filed: Apr. 30, 2004

(65) Prior Publication Data
US 2005/0241705 A1 Nov. 3, 2005

(51) Int. Cl.
*F16K 11/052* (2006.01)

(52) U.S. Cl. ........................ 137/876; 251/305; 384/129

(58) Field of Classification Search ................ 251/304, 251/305, 306; 137/876; 384/129
See application file for complete search history.

(56) References Cited

U.S. PATENT DOCUMENTS

| | | | | |
|---|---|---|---|---|
| 2,676,604 A | * | 4/1954 | Senna | 137/171 |
| 3,269,785 A | * | 8/1966 | Lefevre | 384/129 |
| 4,148,458 A | | 4/1979 | Holtgraver | |
| 4,200,258 A | * | 4/1980 | Gliatas | 251/214 |
| 4,332,271 A | | 6/1982 | Rohr | |
| 5,169,121 A | | 12/1992 | Blanco et al. | |
| 5,269,493 A | | 12/1993 | Junier | |
| 5,458,148 A | | 10/1995 | Zelczer et al. | |
| 5,533,929 A | | 7/1996 | Attridge, Jr. | |
| 5,758,684 A | | 6/1998 | Hudson et al. | |
| 6,105,927 A | | 8/2000 | Zelczer et al. | |
| 6,206,034 B1 | | 3/2001 | McHugh | |
| 6,308,723 B1 | | 10/2001 | Louis et al. | |
| 6,394,068 B1 | | 5/2002 | Palotay | |
| 6,508,455 B1 | | 1/2003 | Rauch et al. | |
| 6,565,067 B1 | | 5/2003 | Nanba et al. | |
| 6,568,417 B1 | | 5/2003 | Laney | |
| 6,651,622 B1 | | 11/2003 | Yanagll | |
| 6,676,109 B1 | * | 1/2004 | Gomi et al. | 251/288 |

FOREIGN PATENT DOCUMENTS

| | | |
|---|---|---|
| EP | 0972975 A1 | 1/2000 |
| EP | 05252700.9-2422PCT | 8/2005 |
| NL | 1015552 C | 1/2002 |

* cited by examiner

*Primary Examiner*—John Fox
(74) *Attorney, Agent, or Firm*—Ingrassia Fisher & Lorenz (57) ABSTRACT

The present invention provides a lounge valve mounting housing and assembly. The housing and assembly are useful for directing air through ducts, and particularly the assembly is useful for directing air, or other fluid, through Y-shaped junctions. The housing comprises in part a plate and a supported platform. The plate mounts to a duct. An actuator assembly can be affixed to the platform. The housing further includes a cylinder; a shaft is disposed within the cylinder and extends into the duct. A flapper affixed to the shaft can direct air depending on the radial position of the shaft. The housing and assembly offers weight and capital advantages over dual valve assemblies.

12 Claims, 5 Drawing Sheets

LOUNGE VALVE MOUNTING HOUSING AND ASSEMBLY

FIELD OF THE INVENTION

The present invention relates to mounting housings for use with valves. More particularly the invention relates to methods and materials for constructing and installing a diverter valve in a multi-chambered conduit. The invention particularly relates to a mounting housing and assembly that can be used with a lounge valve for use in an environmental control conduit in aircraft.

BACKGROUND OF THE INVENTION

Aircraft and other vehicles often include climate control and environmental control systems. One aspect of such systems is the ability to divert or control air flow between two or more positions. In an airplane cockpit, for example, there is frequently found a lounge valve system which controls air flow. In the lounge valve system, a series of valves directs air between the pilot's position and the co-pilot's position.

In prior art systems that employ the lounge valve arrangement, air from some environmental control unit such as an air conditioner or heater is directed to a general location, such as the cockpit of an airplane, through a single duct. In the cockpit area the single duct then splits into two (or more) branches in order to direct air to specific locations. A typical arrangement involves a Y junction in which air from the source is then directed to the pilot's location and to the co-pilot's location by separate ducts. Within each separate duct there is positioned a flow valve. Typically this valve is an in-line valve such that the valve is inserted into the duct by cutting the duct, placing the valve at the cut location, and then clamping each of the two severed ends of the duct to the valve. Each valve is thus independently operated so as to close air flow or allow air flow from a partial to a full amount.

This prior art means of controlling air flow is disadvantageous for several reasons. First, in the aircraft environment, weight is at a premium. The use of two or more separate valves to independently control air flow in each duct entails the use of extra weight. It would be desired to design an air flow control system that achieves a similar air control at a lower weight.

A second disadvantage and limitation of the prior art method is the cost associated with multiple valve control. The capital cost of a single valve is duplicated with each additional valve installed on the system. Cost savings is always a desired improvement.

A further disadvantage of the prior art lounge valve system is the difficulty of installing and servicing such a system. A system that uses in-line flow control valves requires a technician's labor to cut lines, install, remove and/or replace valves, and then reconnect the lines. This labor must be repeated for multiple valves if, as is typical, the system uses multiple in-line valves. A simpler system that reduces the need for such labor would be desired. Further, in the airplane environment, space is also at a premium. Thus any system that is more easily removed and/or replaced is also advantageous.

Hence there is a need for an improved flow control system. There is a need for an air control system that provides air flow control at a relatively reduced weight; that provides a cost savings over known methods, and that can be relatively easily installed and serviced. The present invention addresses one or more of these needs.

SUMMARY OF THE INVENTION

The present invention provides a lounge valve mounting housing that is capable of mating or attaching to a valve or actuator arm such as a control valve. The mounting housing further includes a plate whereby the housing may be affixed to a conduit or duct. The housing also includes an assembly of a shaft and flapper whereby air flow within a duct may be controlled by movement of the flapper.

In one embodiment, and by way of example only, there is provided a mounting housing assembly for connecting a valve actuator to a conduit comprising: a housing comprising a plate and a platform; a cylinder disposed on the housing; a shaft disposed within the cylinder; and a flapper attached to the shaft. Supports that separate the platform and the plate may also be included in the housing. In one embodiment the flapper does not contact the walls of the conduit. The flapper does provide a degree of air diversion or obstruction, such as the area obstructed is 70% of the passage area, and thus 30% of the passage area allows air to pass therethrough. An aluminum guide for the flapper may be disposed within the cylinder.

In an additional embodiment, and by way of example only, there is provided a housing assembly for receiving an actuator with an actuator arm and diverting air within a conduit comprising: a housing having a plate, a platform, and walls to separate said plate and platform, and a cylinder wherein the platform is capable of receiving an actuator; a shaft rotatably disposed within the cylinder wherein the shaft also comprises engagement means capable of receiving an actuator arm; and a flapper affixed to the shaft that is capable of diverting air within a conduit. A spring may be disposed within the shaft such that the spring biases the actuator arm and the shaft away from each other when the shaft receives the actuator arm. The shaft may further comprise a shoulder to limit the lateral motion of the shaft within the cylinder. The engagement means may comprise a toothed spline disposed within a hollow area of the shaft that is capable of receiving a reciprocal toothed spline of the actuator arm. The engagement means allow rotational movement of an actuator arm to impart rotational force onto the shaft and thereby onto the flapper. The housing may be a unitary piece comprised of carbon reinforced polyetherimide resin. The flapper may be aluminum. The shaft may be of the same material as the housing or different. The flapper may be of different shapes such as circular or parabolic.

In a further embodiment, still by way of example only, there is provided a method for affixing a diverter valve to a conduit comprising the steps of: cutting a slit in the conduit capable of passing a diverter valve flapper into the conduit; inserting a flapper and shaft through the slit into the interior of the conduit; and securing a housing plate to the conduit surface. The step of securing the housing plate to the footing may comprise bolting the housing plate to the footing. An additional step of placing a gasket between the housing plate and the footing may be included. The method may further comprising the step of preparing a footing on the conduit surface; and wherein the housing plate is secured to the footing. When a footing is not used a cushioned gasket may be placed on the surface of the conduit; and the housing plate secured to the conduit surface with the gasket between the housing plate and the conduit surface.

Other independent features and advantages of the lounge valve mounting housing and assembly will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
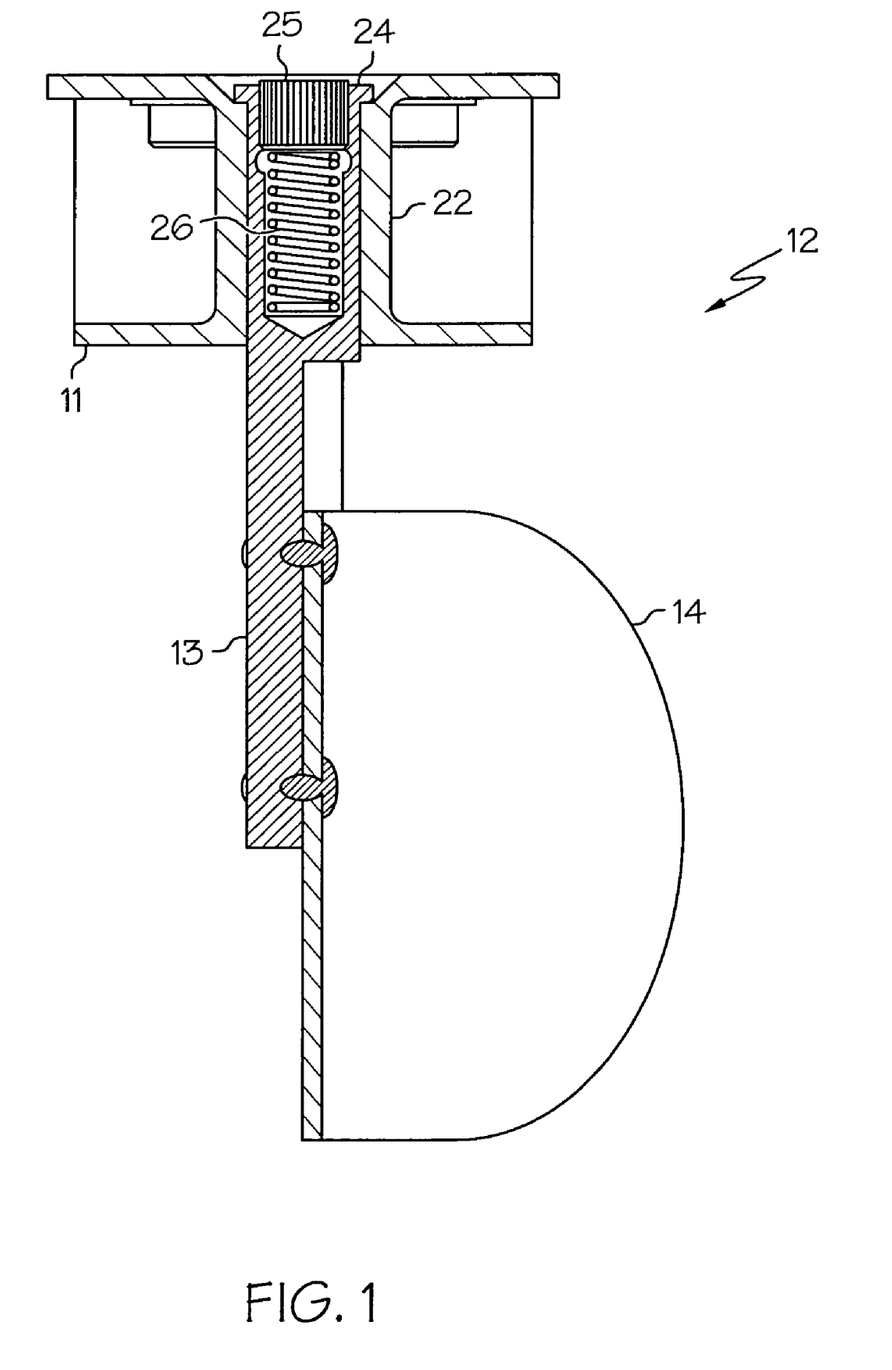
FIG. 1 is a side view of a lounge valve mounting housing and assembly according to one embodiment of the invention.

There is shown in FIG. 1 an embodiment of the lounge valve mounting housing according to the present invention. The mounting housing 10 includes housing 11, shaft 13, and flapper 14.

Figure 2:
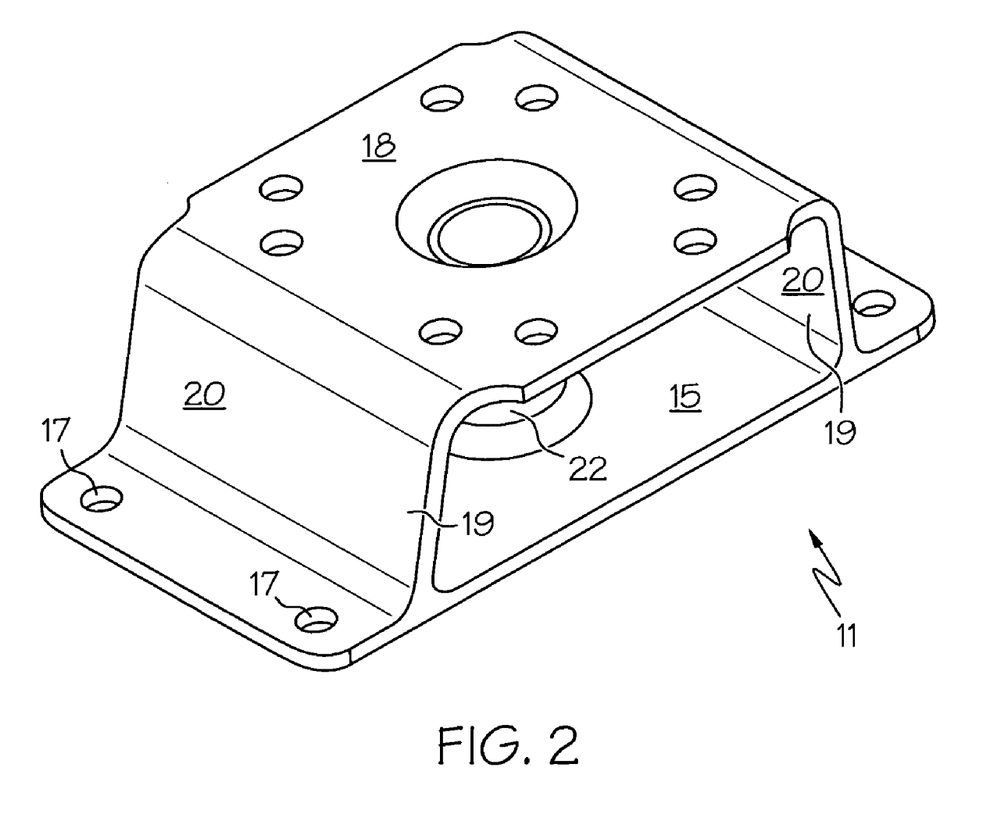
FIG. 2 is a perspective view of a mounting housing according to one embodiment of the invention.

Referring now to FIG. 2 there is shown an embodiment of mounting housing 11. In a preferred embodiment mounting housing 11 is a unitary molded piece with individual features. Alternatively housing 11 may be assembled from components. For example, housing 11 may be welded of individual aluminum pieces. Housing 11 includes plate 15. Plate 15 is a substantially planar surface. Plate 15 defines orifice 16. In one embodiment plate 15 is generally rectangular in shape although other shapes may be used. Bolt holes 17 may be drilled in plate 15. Plate 15 may be used to secure housing 11 such as to a duct or conduit.

Mounting housing 11 also includes platform 18. Platform 18 is a surface onto which a further body such as an actuator assembly or control valve may be affixed. Thus the surface of platform 18 may be adapted to receive the corresponding mounting surface of the assembly or control valve. In a preferred embodiment, platform 18 is a substantially planar surface. Platform 18 may also have holes with which to affix a control valve to platform 18. In one embodiment bolts connect a control valve to platform 18. The bolts may be accessed through the open area that is defined between plate 15 and platform 18.

Figure 4:
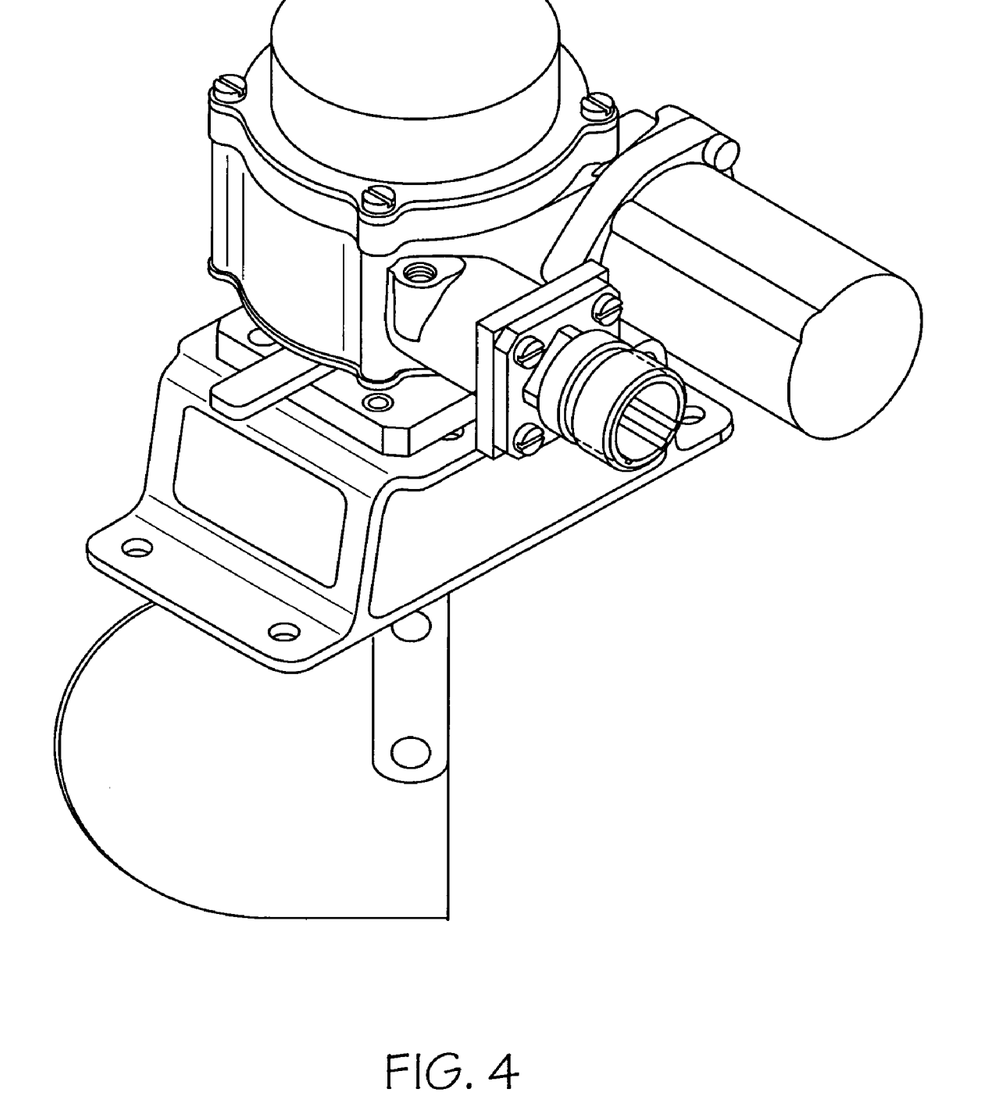
FIG. 4 is a perspective view of a lounge valve mounting housing and assembly, according to an embodiment of the invention, affixed to an exemplary actuator.

As previously mentioned, the housing and assembly is designed to be used with another body such as a control valve with an actuator arm. FIG. 4 illustrates the appearance of mounting housing 10 with an actuator positioned on it.

Figure 3:
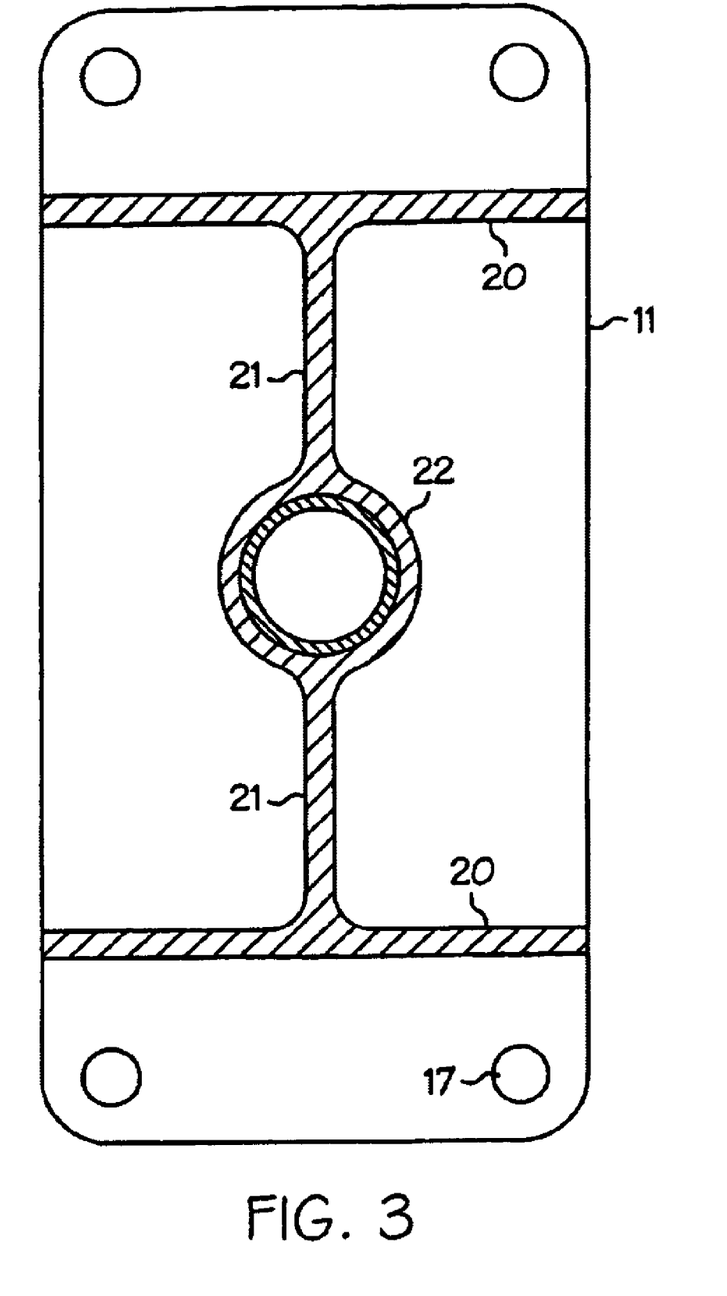
FIG. 3 is a cross-sectional view of a mounting housing according to one embodiment of the invention.

Platform 18 is joined to plate 15 by supports 19. Supports 19 are preferably wall-like structures. Supports 19 provide a desired degree of separation between platform 18 and plate 15. The separation between platform 18 and plate 15 allows access to platform 18 and plate 15 in the area that lies between these two surfaces. This area is useful for accessing fasteners, such as bolts, that may be attached to housing 11 at platform 18 or plate 15. In a preferred embodiment, supports 19 include outer supports 20 and cylinder supports 21. This is illustrated in FIG. 3 which shows a cross section of housing 11. Cylinder supports 21 are set at a transverse position between outer supports 20 and cylinder 22. Transverse supports 21 provide stability and support to cylinder 22. In another embodiment transverse supports 21 are omitted from housing 11. When only outer supports 20 are used, when transverse supports 21 are not present, an optional weight savings can be achieved. Further weight saving can be achieved by cutting windows (removing material) from outer supports 20 as shown in FIG. 4.

Cylinder 22 is a vertical structure running between platform 18 and plate 15. Cylinder 22 also provides a connection and support between platform 18 and plate 15. Cylinder 22 has a hollow interior so as to allow a shaft or rod to pass therethrough and rotate therein. The exterior shape of cylinder 22 can take various shapes, a cylindrical shape is preferred for weight and material savings. At the points where cylinder 22 meets platform 18 and plate 15, there is defined a hole that allows access to the hollow interior of cylinder.

Figure 5:
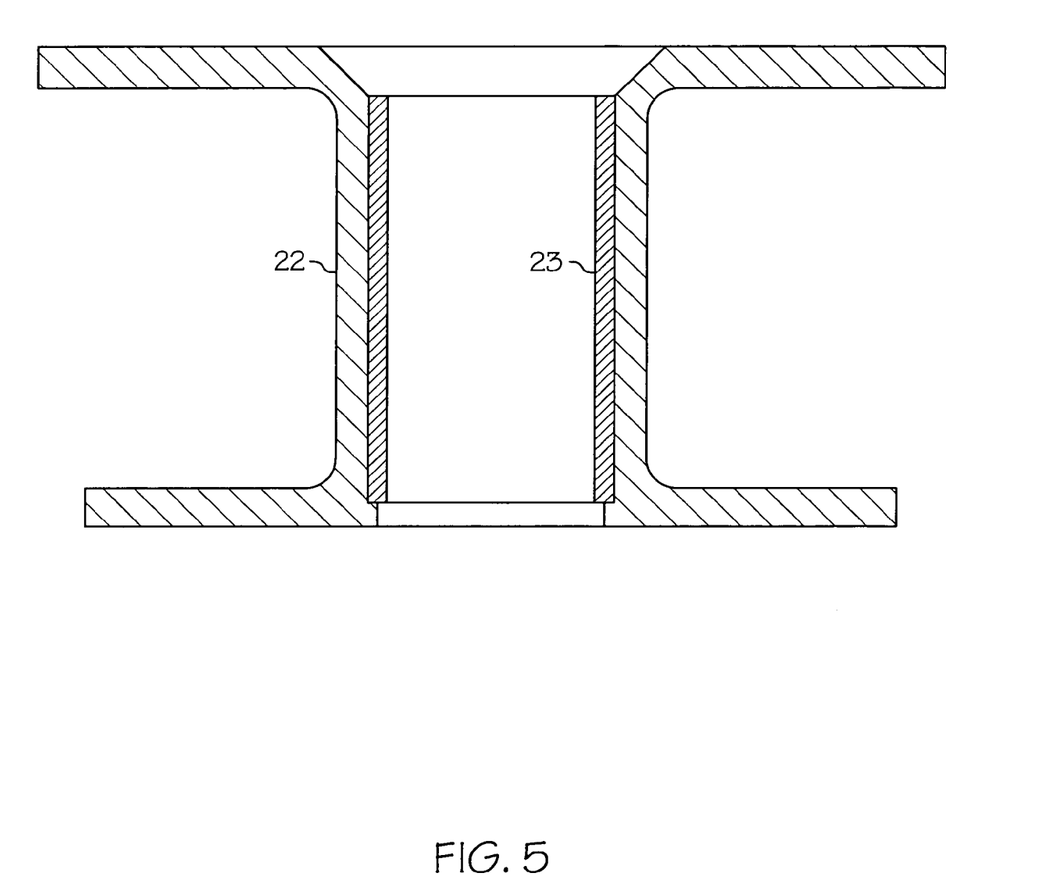
FIG. 5 is a cross-sectional view of a mounting housing according to one embodiment of the invention.

Optionally, as shown in FIG. 5, a bushing 23 may be disposed within cylinder 22. When bushing 23 is present, it is preferably press fit within cylinder 22. Also, when a bushing is used, cylinder 22 may include a shoulder that acts to retain bushing 23 at a desired position within cylinder 22. Preferably bushing 23 is not used in order to achieve weight and material savings. Preferably shaft 13 and cylinder 22 are selected of materials that have an acceptably low degree of friction so that no further bushing or lubricant is necessary.

Referring again to FIG. 1 shaft 13 is configured to fit within the space defined by the interior of cylinder 22. Shaft 13 is thus generally cylindrical in shape at those points on shaft that are in contact with cylinder 22. Shaft 13 and cylinder 22 are sized so that shaft 13 is free to rotate within cylinder 22. In a preferred embodiment, shaft 13 includes a shoulder 24. Shoulder 24 acts to hold shaft 13 from moving axially within cylinder 22 beyond the point at which shoulder 24 contacts cylinder 22. When shaft 13 is configured with shoulder 24, it is preferred to fabricate housing 11 with a flat landing area where shoulder 24 contacts housing 11. As shown in FIG. 1 this contact area generally corresponds to the area on platform 18 around the hole defined by cylinder 22.

In a preferred embodiment, shaft 13 includes engagement means 25. As shown engagement means 25 is preferably a hollow area located at the upper end of shaft 13, the end of shaft 13 that is generally located proximate to platform 18. When shaft 13 includes shoulder 24, engagement means 25 is configured at the end of shaft 13 with shoulder 24. Preferably engagement means 25 comprises a toothed spline that is capable of receiving a reciprocal toothed spline therein. Engagement means 25 may also comprise a gear. Thus, for example, an actuator shaft (not shown) driven by a control valve may have a toothed spline that fits within engagement means 25 of shaft 13. In this manner, a control valve may impart a controlling motion on shaft 13.

Also in a preferred embodiment, shaft 13 includes a spring 26 disposed within a hollow area of shaft 13. In the embodiment of shaft 13 that includes a spline as engagement means 25 the hollow area wherein spring 26 is located is a continuation of the same hollow area that includes the spline. Spring 26 rests against a bottom portion of the hollow area; this bottom portion is a part of the body material of shaft 13. Spring 26, acting in conjunction with other components, acts to hold shaft 13 so that shoulder 24 is pressed against housing 11. In a fully assembled and operational configuration, an actuator will protrude into the area that comprises engagement means 25. In doing so, this actuator will depress spring 26. Spring, pressing against the actuator and shaft 13, will thus exert a force so as to bring shoulder 24 into contact with housing 11.

Still referring to FIG. 1 flapper 14 is affixed to shaft 13. Different means of attachment may be used including welding, riveting, and bolting flapper 14 to shaft 13. In a preferred embodiment, shaft 13 is machined to be flat at the area where flapper 14 is attached. Flapper 14 can then be riveted or spot welded to shaft 13. Preferably flapper 14 is fabricated from a lightweight rigid material such as aluminum or aluminum alloy sheet.

Flapper 14 is configured in profile so as to fit and move within a duct. As illustrated in FIG. 1, the flapper may take a parabolic shape in order to fit within a parabolic shaped duct. Other shapes are possible. Flapper 14 may be rounded or circular in shape for example. A circular shaped flapper disposed within a circular duct may act as a butterfly valve, allowing air passage and restricting air passage depending on the position of flapper 14 within the duct. In a preferred embodiment the outer edge of flapper 14 is cut so that it does not make contact with the interior surface of the duct within which it is positioned.

The housing and components can be fabricated from any of the known engineering materials. Plastic materials are one acceptable material. In airplane environments, aircraft aluminum and alloys thereof are also acceptable. A preferred material with which to fabricate the housing and components is polyetherimide (PEI) thermoplastic developed and sold under the trade name ULTEM®. ULTEM® was introduced by General Electric in the 1970's. It is an amorphous resin. It demonstrates high mechanical strength and rigidity, good chemical resistance, and inherently low flammability. ULTEM® resin is machinable and has a stable dielectric constant. It is a material known and used to fabricate various aircraft components. ULTEM® resin may be used as an unfilled resin; however, it is preferably used with a filler such as carbon or fiberglass. A preferred filling specification for the lounge valve mounting housing is approximately 20% carbon fiber reinforced.

Having described the invention from a structural standpoint, a method and manner of using the invention will now be described.

In one embodiment, the lounge valve mounting housing is mounted onto a footing prepared on the duct that is to receive the housing. The footing is substantially flat and provides a mating surface on which the plate 15 of housing 11 may be affixed. A gasket may be interposed between the footing of the duct and plate 15 in order to minimize leakage of air or other fluid from the duct.

In an alternative embodiment, where for example, the mounting housing is to be retrofit onto ducts that are not fabricated with a footing, the attachment of the mounting housing to the duct is preferably done in a slightly different fashion. Where the housing is affixed to a duct that has a curved surface rather than a planar surface, a cushioned gasket is interposed between the housing and the duct. The cushioned gasket is a sponge-like structure of sufficient thickness so that when the housing is affixed to the duct, the housing compresses the gasket. The compression of the gasket acts to mold or adapt the gasket against the duct thereby providing a desired degree of sealing between the duct and the housing. Further, the compression of the gasket also acts to provide a sealing surface against the housing. The cushioned gasket is selected so as to provide a desired degree of sealing between the mounting housing and the duct. Thicker cushion gaskets that are compressed provide a higher level of sealing than do thinner cushion gaskets.

The lounge valve mounting housing of the present invention may be installed and put into service without the need of severing an existing duct. In a preferred embodiment a slit is cut into the duct in the area of the footing. The geometry and dimension of the slit is sufficient to allow flapper 14 and shaft 13 to pass through the slit from the duct exterior into the interior area of the duct. Further the slit is of a sufficient size so as not to interfere with the operation of flapper 14 and shaft 13 when mounted.

The mounting housing may be affixed to the duct once the flapper and shaft have been placed through the slit. The mounting housing may be affixed by any known method such as but not limited to bolting, screwing, gluing, clamping, and riveting. In a preferred embodiment, corresponding bolt holes are fashioned in the duct footing and in the mounting housing. The mounting housing is thus bolted to the duct once the bolt holes on the footing and the housing are aligned. As indicated in FIG. 3 the bolt holes are preferably positioned at four corners of housing. This position allows the mounting housing to be affixed to a duct without interfering with the flapper's operation in the duct.

When the mounting housing is affixed to the duct, the control valve may be attached to the mounting housing. Control lines such as power lines and signal lines may then be attached to the control valve.

For maintenance purposes, removal of the mounting housing generally involves the reversal of the above-noted steps. Control and power lines are disconnected from the control valve if desired. If desired, the control valve can be removed from the mounting housing. The mounting housing itself is removed from the duct by undoing whatever attachment means was used to attach the mounting housing. In the case of bolts, the bolts are removed. In removing the mounting housing, care should be taken to pass the flapper and shaft through the slit without damage thereto. At this point the control valve and mounting housing may be removed from the vehicle and serviced.

In operation the lounge valve mounting housing and assembly is affixed to a conduit or duct. A valve or actuator arm is also affixed to the housing. An actuator arm is connected to the shaft so that rotational movement of the actuator arm imparts a rotational movement onto the shaft, and therefore onto the flapper. Thus movement of the actuator arm effects a movement of the flapper. The flapper is cut so as to obstruct a portion of the area of the conduit in a fully extended position. The area obstructed is preferably less than 100% of the cross-sectional area of the conduit. In a preferred embodiment, a flapper at most obstructs between about 60% to about 95% of the area of the conduit, and more preferably between about 60% and about 80% of the area of the conduit.

A first advantage of the lounge valve mounting housing is the weight savings that is realized over prior art methods. In current lounge valve systems, a valve is disposed within each arm of a y-shaped conduit so as to independently control air flow through each branch of the conduit. Each valve includes a valve housing and structure. In one embodiment of the present invention, a single diverter is used thus achieving a significant weight savings.

An additional advantage of the lounge valve mounting housing is the capital cost savings that can be realized.

Instead of using a dual valve system, a single diverter flapper is used. There is no need for the expense associated with valve bodies.

A further advantage associated with the lounge valve mounting housing is the improved cost and efficiency associated with its installation and service. The lounge valve is attached to the outside of a conduit and the flapper is inserted to the interior of the conduit through a slit. Thus, there is no need to cut open the conduits and install in-line valves. Removal and service of the lounge valve merely involves unbolting the housing and pulling it off the conduit, a much simpler procedure than removing two in-line valves.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A housing assembly for receiving an actuator with an actuator arm and diverting air within a conduit comprising:
   a housing having a plate, a platform capable of receiving an actuator, and walls to separate said plate and platform, and a cylinder;
   a shaft rotatably disposed within the cylinder, the shaft comprising engagement means capable of receiving an actuator arm;
   a flapper affixed to the shall that is capable of diverting air within a conduit; and
   a spring disposed within said shaft such that said spring biases the actuator arm and the shall away from each other when the shaft receives the actuator arm.

2. The mounting housing assembly according to claim 1 wherein said housing comprises a carbon impregnated composite.

3. The mounting housing assembly according to claim 1 wherein said shaft comprises aluminum.

4. The mounting housing assembly according to claim 1 wherein said flapper does not contact the walls of the conduit.

5. The mounting housing assembly according to claim 4 wherein the area of the conduit obstructed by the flapper is between about 80% to about 60%.

6. The mounting housing according to claim 1 further comprising an aluminum guide disposed within said cylinder.

7. The housing assembly according to claim 1 wherein said shaft further comprises a shoulder.

8. The housing assembly according to claim 1 wherein said engagement means comprises a tooted spline disposed within a hollow area of said shaft.

9. The housing assembly according to claim 1 wherein said engagement means allow rotational movement of an actuator arm to impart rotational force onto the shaft and thereby onto the flapper.

10. The housing assembly according to claim 1 wherein said housing is a unitary piece comprised of carbon reinforced polyetherimide resin.

11. The housing assembly according to claim 1 wherein said flapper is circular in shape.

12. The housing assembly according to claim 1 wherein said flapper is parabolic in shape.

* * * * *

UNITED STATES PATENT AND TRADEMARK OFFICE
CERTIFICATE OF CORRECTION

| | | |
|---|---|---|
| PATENT NO. | : 7,093,618 B2 | Page 1 of 1 |
| APPLICATION NO. | : 10/836985 | |
| DATED | : August 22, 2006 | |
| INVENTOR(S) | : Mark W. Williams et al. | |

It is certified that error appears in the above-identified patent and that said Letters Patent is hereby corrected as shown below:

Column 7, line 35, "shall" should be changed to --shaft--;
Column 8, line 2, "shall" should be changed to --shaft--;
Column 8, line 21, "tooted" should be changed to --toothed--.

Signed and Sealed this

Twenty-seventh Day of March, 2007

JON W. DUDAS
*Director of the United States Patent and Trademark Office*